United States Patent [19]

Myszka

[11] Patent Number: 5,454,216
[45] Date of Patent: Oct. 3, 1995

[54] SPINDLE FOR MOWER DECK

[75] Inventor: Kevin Myszka, Copley, Ohio

[73] Assignee: MTD Products Inc., Cleveland, Ohio

[21] Appl. No.: 147,477

[22] Filed: Nov. 5, 1993

[51] Int. Cl.⁶ .................................................. A01D 34/82
[52] U.S. Cl. ............................ 56/17.500; 56/255; 56/295
[58] Field of Search ........................ 56/255, 295, 17.5, 56/DIG. 17, DIG. 20

[56] References Cited

U.S. PATENT DOCUMENTS 4,114,269  9/1978  Ballas, Sr. ..................... 56/12.7 X
4,936,884  6/1990  Campbell ......................... 56/12.7
5,284,006  2/1994  Sheldon ........................... 56/255

Primary Examiner—Terry Lee Melius
Attorney, Agent, or Firm—Lightbody & Lucas

[57] ABSTRACT

A spindle end/blade hole combination using a symmetrical six pointed star having differing radiused ends as the interconnection therebetween.

14 Claims, 1 Drawing Sheet 5,454,216

SPINDLE FOR MOWER DECK

FIELD OF THE INVENTION

This invention relates to an improved drive interconnection for spindles used in rotary blade lawn mowers, both walking and riding lawn mowers.

BACKGROUND OF THE INVENTION

Lawn and garden mowers customarily have rotary blades suspended beneath a mowing deck for use in cutting the lawn. In most single spindle mowers, the spindle is coextensive with the engine shaft. In multiple spindle mowers, there is customarily a belt between the various spindles and the remotely located engine. In all instances, the cutting blade is fixedly connected to the bottom end of the spindle for rotation therewith, customarily by a simple bolt. This is normally sufficient for passage of torque between the engine and the mowing blade. However, as mowing blades begin to perform high power mulching actions and as more and more mowers begin to incorporate blade brakes, there is a need for a method of passing greater amounts of torque and even bidirectional torque between the blade and spindle. Customarily this need has been solved by incorporating an intermediate piece between the bottom end of the spindle and the mowing blade, which intermediate piece includes pilot extensions for inter engagement with the mowing blade at a location remote from the rotary center thereof. This, however, increases the cost and complexity of this interconnection.

OBJECTS AND SUMMARY OF THE INVENTION

It is an object of the present invention to provide for a high torque interconnection between a blade spindle and a mowing blade.

It is another object of the present invention to provide for a low cost method of interconnecting a mowing blade to a blade spindle.

It is yet another object of the present invention to facilitate the operation of interconnecting a mowing blade to a spindle.

It is still another object of the present invention to provide for a reliable and simple method of interconnecting a blade to a blade spindle.

Other objects and a more complete understanding of the invention may be had by referring to the drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

Figure 1:
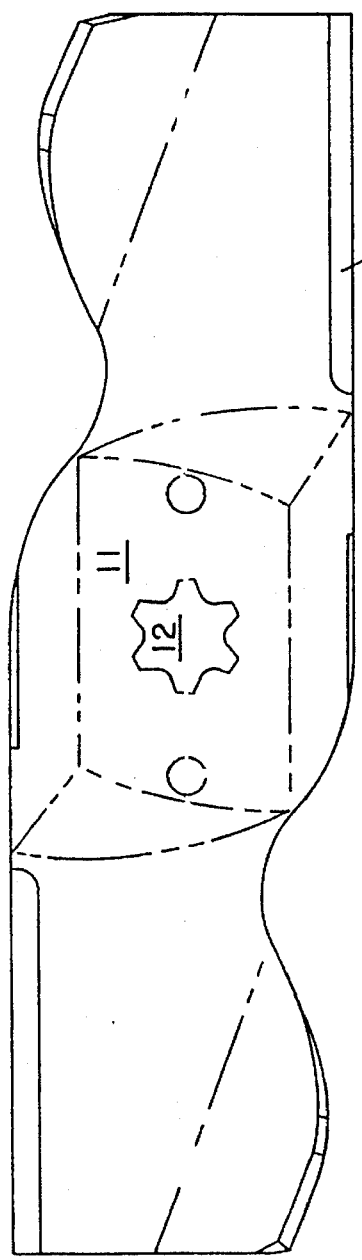
FIG. 1 is a top view of a mowing blade incorporating the invention of the application.

The interconnection of this invention is designed for use with a mowing blade 10 and a spindle 20.

The blade spindle 20 includes a circular outer flange 21, a recessed section 22, a raised section 23 and a mounting hole 24.

The outer flange 21 of the spindle 20 is a flat area designed to hold the mowing blade 10 against lateral flexing in respect to the central axis of the spindle 20. The particular outer flange disclosed is a doughnut shaped flat surface some 1.700 inches in outer diameter and approximately 1.400 inches in inner diameter. This substantially 0.30 inch diameter cylindrically shaped flat surface provides a solid bedding location for the mowing blade 10. In the preferred embodiment disclosed, the outer diameter of the flange 21 substantially matches the width of the flat surface area 11 on the mower blade. The outer flange 21 thus supports the mowing blade over its complete width.

The recessed area 22 is located immediately inward of the outer flange 21. The purpose of this recessed area is to allow a slight area of clearance for the forging operation which is utilized to form the raised section 23 of the spindle 20. The recessed area 22 further allows for material to break out in the central mounting hole 12 in the mowing blade 10. This allows the mower blade 10 to mount solidly with the outer diameter of the flange 21. The recessed area in addition allows for some over-tightening of the later described bolt 30 with the sections of the blade 10 immediately outside of the central mounting hole 12 flexing slightly into the recessed area 22. This aids in holding the bolt 30 in place. The recessed area 22 shown has an outer diameter of approximately 1.40 inches and inner diameter of approximately 0.680 inches. The recess is approximately 0.03 inches deep.

The raised section 23 of the spindle 20 is the main drive interconnection between spindle 20 and the blade 10. The raised section 23 is formed into a toothed star with the central mounting hole 12 in the blade 10 formed with a complementary shape. With this design, the edges of the outwardly extending teeth of the raised section 23 pass the torque between the spindle 20 and mower blade 10. The star shown has a six points having an inner diameter of 0.680 inches, an outer diameter of 1.00 inches, and a height of approximately 0.32 inches.

The teeth 30 of the raised section 23 each have a edge 31, a further edge 32 and outer end 33. The edge 31 and further edge 32 are located symmetrically in such that a first line 35 extending from said first edge 31 and a second line 36 in respect to said further edge 32 each form substantially a 20 degree angle in respect to the center line 34 of the teeth 30. The teeth 30 are located symmetrically about the raised section 23 having substantially a 60 degree angle in respect to the center line 34 of the adjoining teeth. With this orientation, the first line 35 of a given tooth 30 intersects a edge 31 of a tooth one removed, with said intersection occurring substantially at the intersection of such line 35 with the outer end 33 of said such other tooth. This orientation optimizes the passage of torque between the spindle 20 and the blade 10 by causing such point of intersection at or near the outer end of the tooth once removed to act as a pivot point in respect to the drive edge 31 of the spindle. This allows for the more efficient passage of torque between the blade and spindle than otherwise by maximizing the effective lever. Similarly, the second line 36 in respect to a further edge 32 of a tooth 30 will intersect a further edge 32 of a tooth one removed in the opposite direction, again substantially at the intersection of such line 36 with the outer end 33 of such other tooth.

Although not technically necessary, the points of transition between the edges and the outer ends of the teeth 30 are radiused by approximately 0.0625 inches. This radius reduces the possibility of point to point contact between the raised section 23 of the spindle and the mowing blade 10.

The height of the raised section 23 is preferably equal to or slightly less than the thickness of the mowing blade 10.

The central hole 12 in the mowing blade 10 is formed complementary to the raised section 23 of the spindle 20. In the embodiment shown, this hole 12 is also a six pointed star having an inner diameter of 0.700 inches, an outer diameter of 1.012 inches, and a depth of 0.34 inches. The outer end of each star is radiused 0.039 inches. Note that the outer ends of the teeth 30 of the spindle 20 are more severely radiused that the corresponding locations of the hole 12 of the blade 10. This difference creates a slight gap between tooth and blade at the very ends of the edges 31 and 32 of the teeth. Further, the difference also provides for a curved line of separation, thus providing a rolling instead sharp edge type contact at this critical point. These increase torque and minimizes metal fatigue.

The hole 24 in the raised section 23 is used to bolt the blade 10 onto the spindle 20, thus holding the two together. A washer 27 having an outer diameter approximately equal to the outer flange 21 of the spindle is utilized between the bolt 40 and lower surface of the mowing blade 10. This washer 27 (shown in the alternate embodiment of FIG. 3) cooperates with the outer flange 21 of the spindle 20 and flat surface area 11 of the blade 10 in order to minimize lateral wobbling of the blade in respect to the spindle. This further strengthens the interconnection between the mower and spindle.

Figure 3:
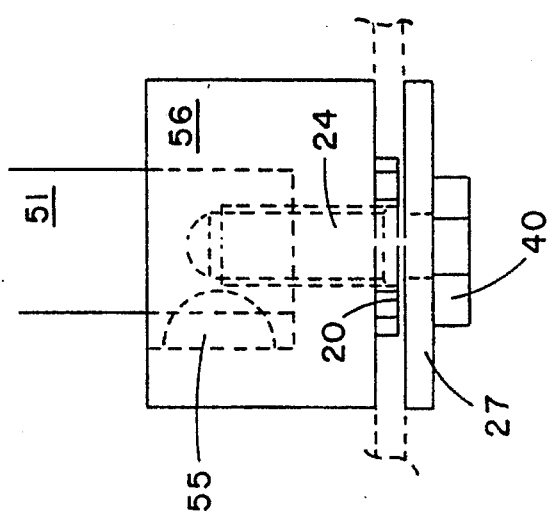
Figure 2:
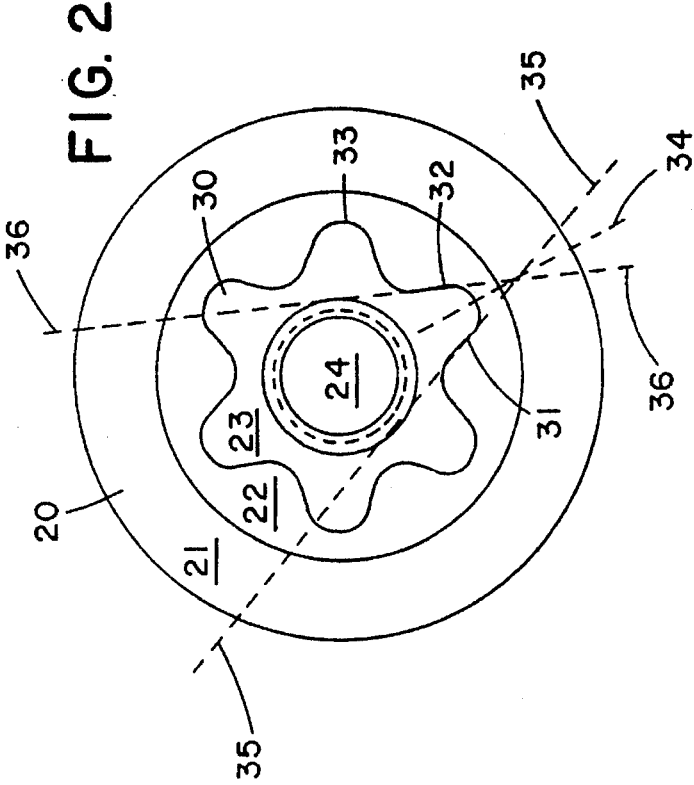
FIG. 2 is a bottom view of an enlarged drive spindle incorporating the invention of the application; and, FIG. 3 is a cutaway side view of a spindle piece for use in adapting existing lawn mowers to the invention of the application.

Although the invention has been described in a preferred form with a certain degree of particularity, it is to be realized that numerous changes can be made without deviating from the invention as hereinafter claimed. For example, although the particular blade spindle shown is integral—that is the end of the spindle is formed integrally with the shaft of the spindle—the invention could also be utilized with a separate engine shaft in order to interconnect the blade to said shaft. This would occur in retrofit type applications wherein the teeth 30 are not integrally formed with said shaft. An example of this is shown in FIG. 3. In this figure, the spindle 20 is formed as a separate piece 50. The inner diameter of this separate piece is approximately equal to the outer diameter of the shaft 51 with which it will be utilized. If the shaft has a particular method of preventing rotation such as a flat area, a woodruf key slot, a raised teeth or other method, the inner diameter of the piece 50 would be formed with a mating section. Alternately or in addition, the member 50 could be glued, welded, or otherwise fixed to the shaft 51. A woodruf key 55 is used to tie the piece 50 to the shaft 51 in the embodiment shown. Once the member 50 is located on the shaft, the device functions similarly to the embodiment of FIG. 2.

What is claimed is:

1. An improved drive connection for a mowing spindle having an end and a mowing blade having a hole, the improvement comprising the end of the spindle and the hole in the mowing blade having a series of outwardly extending teeth, said outwardly extending teeth each having a center line and a straight edge, said straight edges each being angled in respect to its said center line respectively at an angle of substantially 20 degrees, and said center line being angled in respect to each other at substantially 60 degrees or a multiple thereof.

2. The drive connection of claim 1 characterized in that said outwardly extending teeth each have a further straight edge and said further straight edge each being angled in respect to its said center line respectively at an angle of substantially 20 degrees.

3. The drive connection of claim 1 wherein the hole has a diameter and characterized in that said outwardly extending teeth each have a longitudinal height, and said longitudinal height of said teeth being substantially 0.40 of the diameter of the hole.

4. The drive connection of claim 1 characterized in that a line extending centrally from said angled straight edges respectively intersects a said edge of another tooth.

5. The drive connection of claim 4 characterized in that said teeth have outer ends and said intersection with said straight edge occurring substantially at said outer ends of said another tooth.

6. The drive connection of claim 2 characterized in that a line extending centrally from said further straight edges respectively intersects said further straight edge of another tooth.

7. The drive connection of claim 6 characterized in that said teeth have outer ends and said intersection with said further straight edge occurring substantially at said outer ends of said another tooth.

8. The drive connection of claim 1 characterized by the addition of an outer flange at the end of the spindle and said flange being recessed in respect to said teeth.

9. The drive connection of claim 8 characterized by a recessed section, said recessed section being located between said flange and said teeth, and said recessed section being further recessed in respect to said flange.

10. An improved drive connection for a mowing spindle having end and a mowing blade having a hole, the improvement comprising the end of the spindle and the hole in the mowing blade having a series of outwardly extending teeth, said outwardly extending teeth each having a center line and a straight edge and a further straight edge, said straight edges each being angled in respect to said center line respectfully at an angle of substantially 20 degrees, said further straight edges each being angled in respect to its center line respectively at an angle of substantially 20 degrees, said center lines of said teeth being angled in respect to each other at substantially 60 degrees or a multiple thereof, said hole having a diameter, and said longitudinally height of said teeth being substantially 0.40 of said diameter of the hole.

11. The drive connection of claim 10 characterized in that a line extending centrally from said angled straight edges respectfully intersects a said straight edge of another tooth, said teeth having outer ends, said intersection with said straight edge occurring substantially at said outer ends of said another tooth, a line extending centrally from said further straight edges respectfully intersecting said further straight edge of another tooth, and said intersection with said further straight edge occurring substantially at said outer ends of said another tooth.

12. The drive connection of claim 11 characterized in that said outer end has a length, and said length of said outer end being substantially 0.20 times said diameter of said hole.

13. An improved drive connection for a mowing spindle having an end and a mowing blade having a hole, the improvement comprising the end of the spindle and the hole in the mowing blade having a series of outwardly extending teeth, said outwardly extending teeth each having a center line and a straight edge, said straight edges each being angled in respect to its said center line, respectively at an angle of substantially 20 degrees, said center lines being angled in respect to each other, an outer flange, and said outer flange being located at the end of said spindle surrounding said teeth.

14. An improved drive connection for a mowing spindle having an end and a mowing blade having a hole, the improvement comprising the end of the spindle and the hole in the mowing blade having a series of outwardly extending teeth, said outwardly extending teeth each having a center line and a straight edge, said straight edges each being angled in respect to its said center line, said center lines being angled in respect to each other, an outer flange, said outer flange being located at the end of said spindle surrounding said teeth, a recessed section, said recessed section being located between said flange and said teeth, and said recessed section being further recessed in respect to said flange.

* * * * *